United States Patent  
Cho et al.

(10) Patent No.: US 11,493,433 B2  
(45) Date of Patent: Nov. 8, 2022

(54) NORMAL INCIDENCE ELLIPSOMETER AND METHOD FOR MEASURING OPTICAL PROPERTIES OF SAMPLE BY USING SAME

(71) Applicant: KOREA RESEARCH INSTITUTE OF STANDARDS AND SCIENCE, Daejeon (KR)

(72) Inventors: Yong Jai Cho, Daejeon (KR); Won Chegal, Daejeon (KR); Hyun Mo Cho, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 0 days.

(21) Appl. No.: 17/256,966

(22) PCT Filed: Jul. 3, 2019

(86) PCT No.: PCT/KR2019/008147  
§ 371 (c)(1),  
(2) Date: Dec. 29, 2020

(87) PCT Pub. No.: WO2020/013517  
PCT Pub. Date: Jan. 16, 2020

(65) Prior Publication Data  
US 2021/0181090 A1 Jun. 17, 2021

(30) Foreign Application Priority Data  
Jul. 12, 2018 (KR) .......................... 10-2018-0081169

(51) Int. Cl.  
*G01N 21/21* (2006.01)  
*G01B 11/27* (2006.01)  
*G01N 21/13* (2006.01)

(52) U.S. Cl.  
CPC .......... *G01N 21/211* (2013.01); *G01B 11/272* (2013.01); *G01N 21/13* (2013.01);  
(Continued)

(58) Field of Classification Search  
CPC ..................................................... G01N 21/211  
(Continued)

(56) References Cited

U.S. PATENT DOCUMENTS 6,583,875 B1 * 6/2003 Wei ...................... G01B 11/065  
374/E11.018  
6,753,961 B1 6/2004 Norton et al.  
(Continued)

FOREIGN PATENT DOCUMENTS

EP 3035034 A1 12/2015  
JP 2010-530074 A 9/2010  
(Continued)

OTHER PUBLICATIONS

International Search Report of PCT Application No. PCT/KR2019/008147—4 pages (dated Oct. 10, 2019).  
(Continued)

*Primary Examiner* — Tarifur R Chowdhury  
*Assistant Examiner* — Omar H Nixon  
(74) *Attorney, Agent, or Firm* — Knobbe Martens Olson & Bear LLP

(57) ABSTRACT

The present invention relates to a normal incidence ellipsometer and a method for measuring the optical properties of a sample by using same. The purpose of the present invention is to provide: a normal incidence ellipsometer in which a wavelength-dependent compensator is replaced with a wavelength-independent linear polarizer such that equipment calibration procedures are simplified while a measurement wavelength range expansion can be easily implemented; and a method for measuring the optical properties of a sample by using same.

21 Claims, 6 Drawing Sheets

(52) U.S. Cl.
CPC ............... *G01N 2021/213* (2013.01); *G01N 2201/0231* (2013.01); *G01N 2201/0612* (2013.01); *G01N 2201/0633* (2013.01); *G01N 2201/0636* (2013.01); *G01N 2201/0683* (2013.01)

(58) Field of Classification Search
USPC ........................................................ 356/364
See application file for complete search history.

(56) References Cited

U.S. PATENT DOCUMENTS

| | | | |
|---|---|---|---|
| 6,781,692 B1* | 8/2004 | Rosencwaig | G01N 21/211 356/369 |
| 7,355,708 B2 | 4/2008 | Aspnes | |
| 7,889,340 B1 | 2/2011 | Flock et al. | |
| 9,404,872 B1* | 8/2016 | Wang | G01N 21/274 |
| 2002/0039184 A1* | 4/2002 | Sandusky | G01J 3/0229 356/369 |
| 2005/0157295 A1* | 7/2005 | Chegal | G01N 21/211 356/369 |
| 2005/0248763 A1 | 11/2005 | Aspnes | |
| 2005/0248773 A1* | 11/2005 | Rosencwaig | G01N 21/211 356/504 |
| 2005/0252752 A1* | 11/2005 | Fielden | G03F 7/70916 200/43.04 |
| 2007/0091311 A1 | 4/2007 | Aspnes | |
| 2007/0091325 A1* | 4/2007 | Nikoonahad | G01N 21/95623 356/625 |
| 2012/0176618 A1* | 7/2012 | Vagos | G01N 21/23 356/369 |
| 2013/0044318 A1* | 2/2013 | Cho | G01N 21/211 356/369 |
| 2014/0375981 A1* | 12/2014 | Wang | G01N 21/956 356/51 |
| 2016/0334342 A1* | 11/2016 | Chuang | H04N 5/3722 |
| 2018/0113069 A1 | 4/2018 | Cho et al. | |

FOREIGN PATENT DOCUMENTS

| | | |
|---|---|---|
| KR | 10-2013-0019495 A | 2/2013 |
| KR | 10-1590389 B1 | 2/2016 |
| KR | 10-2016-0109786 A | 9/2016 |

OTHER PUBLICATIONS

Azzam, "NIRSE: Normal-Incidence Rotating-Sample Ellipsometer", Optics Communications, vol. 20, No. 3-4 pages (Mar. 1977).
Azzam, "PIE: Perpendicular-Incidence Ellipsometry-Application to the Determination of the Optical Properties of Uniaxial and Biaxial Absorbing Crystals", Optics Communications, vol. 19, No. 1-3 pages (Oct. 1976).
Cho et al., "Universal Evaluations and Expressions of Measuring Uncertainty for Rotating-Element Spectroscopic Ellipsometers", Optics Express, vol. 23, No. 12 (Jun. 12, 2015).
Extended European Search Report dated Jan. 10, 2022 in corresponding European Application No. 19833613.3.
Office Action dated Jan. 26, 2022 in corresponding Japanese Application No. 2021-520898.
RMA Azzam, "Oblique and normal incidence photometric return-path ellipsometers for isotropic and an isotropic surfaces", J. Optics (Paris), 1978, vol. 9, No. 2, pp. 131-134.

* cited by examiner

NORMAL INCIDENCE ELLIPSOMETER AND METHOD FOR MEASURING OPTICAL PROPERTIES OF SAMPLE BY USING SAME

TECHNICAL FIELD

The present invention relates to a normal incidence ellipsometer and a method for measuring optical properties of a sample by using the same. More specifically, the present invention relates to a normal incidence ellipsometer used to measure optical properties of a sample by measuring and analyzing a change in a polarization state of light reflected by the sample and a method for measuring optical properties of a sample by using the same.

BACKGROUND ART

With a rapid development of various industrial fields related to semiconductor devices, flat panel displays, thin-film solar cells, nanoimprint, nanobio, thin-film optics, etc., the thickness of thin films have gradually decreased to reach a level of several atomic layers and shapes of nano-patterns have been complicated from the existing two-dimensional (2D) structure to a three-dimensional (3D) structure. Accordingly, a need for a measurement technology for a process to accurately analyze a shape and physical properties of nano-scale samples such as a thickness of a thin film and a shape of a nano pattern, while adopting a non-contact manner not to damage nano-samples during a manufacturing process of products, has increased. Among these non-contact nanoscale measurement technologies, an ellipsometer and a method using the same have widely been used in line with a development of light sources, photodetectors, and computers.

Types of the ellipsometer may be classified into a normal incidence type and an oblique incidence type. The normal incidence type is a type of measuring a change in a polarization state of light vertically reflected by a sample when a measurement beam is incident perpendicular to a surface of the sample (i.e., an incident angle is) 0°, and the oblique incidence type is a type of performing measurement by allowing an incident angle of a measurement beam to have a value arbitrarily selected from within a range of 0° to 90°. Among them, the normal incidence type has the advantage of reducing a measurement device to be smaller in size and reducing a measurement beam to be smaller so that an internal region of a smaller area may be measured in a sample. Various patent documents such as U.S. Pat. No. 7,355,708 and U.S. Pat. No. 7,889,340 and other papers disclose a basic construction and principle of such a normal incidence ellipsometer.

[Basic Configuration of Normal Incidence Ellipsometer]

An optical element-rotation type ellipsometer may basically include a light source (LS), a polarization state generator (PSG), a sample (SP), a polarization state analyzer, a detection optic system (DOS), and a photodetector element (PDE), and a brief description of each part is as follows. The light source serves to convert light emitted from a lamp into a collimated beam using an optical system. The polarization state generator is a polarization optical system that serves to make the collimated beam emitted from the light source into a specific polarization state. The sample is placed on a traveling path of the modulated incident collimated beam. The polarization state analyzer is a polarization optical system that serves to analyze a polarization state of the reflected collimated beam on a traveling path of a reflected collimated beam reflected by the sample. The photodetector element serves to measure the amount of light of the reflected collimated beam of a designated wavelength band that have passed through the polarization state analyzer as a value such as voltage or current, and an optical property value of the sample may be calculated from the voltage or current values measured in this way using a processor and stored or displayed on a screen. The detection optic system is arranged on an axial line of the reflected collimated beam between the polarization state analyzer (PSA) and the photodetector element (PDE), which may be a virtual polarization optical system having the same effects as those of optical elements that may change a polarization state of the reflected collimated beam and include a reflective mirror, a grating, and the like, installed in a beam splitter and a spectrometer.

As described above, the polarization state generator or the polarization state analyzer is formed of a polarization optical system in which a plurality of rotatable polarization optical elements are appropriately arranged so as to perform their respective roles. Here, at least one rotatable polarization optical element selected from among the rotatable polarization optical elements rotates at a constant speed, and the other rotatable polarization optical elements excluding the constant speed polarization optical elements are fixed polarization optical elements which have moved to a previously designated azimuthal angle for measurement so as to be stopped during measurement.

A type or arrangement of these rotatable polarization optical elements may be appropriately varied depending on the type of the ellipsometer, and specifically, the rotatable polarization optical element may include linear polarizers and compensators. In addition, the linear polarizer disposed in the polarization state generator is referred to as a polarizer, and the linear polarizer disposed in the polarization state analyzer is classified and referred to as an analyzer. The compensator disposed in the polarization state generator is referred to as an incident axis compensator, and the compensator disposed in the polarization state analyzer is classified and referred to as a reflection axis compensator.

The optical element rotation type ellipsometer of the related art may be classified into an oblique incidence type and a normal incidence type based on an angle of incidence (or incident angle). As for the incident angle, among several planes perpendicular to a plane of the sample, a plane including paths of the incident collimated beam and the reflected collimated beam is defined as an incident plane, and when an axis perpendicular to the plane of the sample from the incident plane is a reference axis, an internal angle between the incident collimated beam or the reflected collimated beam and the reference axis is defined as the angle of incidence and designated by φ. The normal incidence type is a type adopting an optical structure in which an incident angle is 0°, and the oblique incidence type is a type adopting an optical structure in which an incident angle is not 0°. The advantage of the normal incidence type compared to the oblique incidence type is that the measuring device may be made smaller and an area of a beam incident on the sample may be reduced to be smaller, enabling measurement of the inside of a fine area.

The principle of the oblique incidence or normal incidence optical element rotation type ellipsometer is described as follows. In the oblique incidence or normal incidence optical element rotation type ellipsometer, the incident collimated beam emitted from a light source is incident on the polarization state generator, the incident collimated beam is changed to a specific polarization state that may be controlled by the polarization state generator, the sample is irradiated with the incident collimated beam modulated into the polarization state, the polarization state of the incident collimated beam is changed by the sample to become reflected collimated beam having physical property information of the sample, the reflected collimated beam is incident on the polarization state analyzer and changed to a specific polarization state that can be controlled once again, the reflected collimated beam which has undergone the series of change are measured as an electrical signal such as voltage or current using the photodetector element, and optical property information of the sample is finally obtained from the electrical signals measured by the processor.

In implementing the polarization state generator and the polarization state analyzer in the normal incidence ellipsometer of the related art, a single compensator-rotation type normal incidence ellipsometer configured by arranging one linear polarizer and one constantly rotating compensator and a dual compensator-rotation type normal incidence ellipsometer configured by arranging one linear polarizer and two constantly rotating compensators are disclosed.

[Configuration of Normal Incidence Ellipsometer of Related Art]

Referring to FIG. 1, a single compensator-rotation type normal incidence ellipsometer 10, which is an exemplary embodiment of the normal incidence ellipsometer of the related art, includes a light source 11, a beam splitter 12, a linear polarizer 13, a constantly rotating compensator 14, a spectrometer 15, and a processor 16.

The single compensator-rotation type normal incidence ellipsometer 10 of FIG. 1 will be described in terms of a basic structure of a measurement principle as follows. An incident collimated beam L10a emitted from the light source 11 travels in a direction perpendicular to a surface of the sample 1000 by the beam splitter 12 and is incident on a fixed polarizer (implemented as the linear polarizer 13). The incident collimated beam L10a incident on the fixed polarizer is modulated in a polarization state, while sequentially passing through the fixed polarizer and a constantly rotating incidence axis compensator (implemented as the constantly rotating compensator 14), and is incident on the sample 1000 (L10b). A reflected collimated beam L10c reflected by the sample 1000 is incident on the constantly rotating reflection axis compensator (also implemented as the constantly rotating compensator 14), and the reflected collimated beam L10c incident on the constantly rotating reflection axis compensator is modulated again in the polarization state, while sequentially passing through the constantly rotating reflection axis compensator (also implemented as the linear polarizer 13) and the fixed analyzer, and incident on the spectroscope 15 by the beam splitter 12 (L10d). The reflected collimated beam L10d incident on the spectrometer is divided by each wavelength and converted into an electrical digital signal value by a photodetector element embedded in the spectrometer 15, and the measured digital signal values are used for optical property analysis of the sample 1000 by the processor 16.

In the exemplary embodiment of FIG. 1, a detection optic system includes a beam splitter 12, a reflective mirror and a grating embedded in the spectrometer 15. In addition, in the exemplary embodiment of FIG. 1, the linear polarizer 13 serves as a fixed analyzer as well as a fixed polarizer, and the constantly rotating compensator 14 serves as a constantly rotating reflection axis compensator as well as a constantly rotating incident axis compensator. Therefore, there is an advantage in that a size of the measuring device may be reduced to be smaller than the oblique incidence type.

The linear polarizer is mainly configured by processing and assembling a crystal having a birefringence characteristic such as $MgF_2$, $CaCO_3$, and $SiO_2$ in a prism shape. Among the electric field components of light incident on the linear polarizer, a component in a direction of a transmission axis of the linear polarizer may be transmitted and a component perpendicular to the transmission axis cannot be transmitted, so that the transmitted light is in a linearly polarized state. In the case of a prismatic linear polarizer without optical activity, a linear polarization state of transmitted light is not affected according to a type of wavelength, and a Rochon type linear polarizer formed of $MgF_2$ may be used for a broadband wavelength range of 150 to 6,500 nm.

Meanwhile, it is most ideal to provide a λ/4 waveplate to form 90° as a difference between an electric field component passed in a fast axis direction and electric field components passed in a slow axis direction perpendicular to the fast axis direction, among electric field components of light incident on the compensator when light having an arbitrary polarization characteristic passes through the compensator. However, in the case of using a plurality of wavelengths, there are difficulties in manufacturing a compensator as described above. Specifically, in order to make a spectroscopic ellipsometer with a compensator capable of performing real-time measurement on a plurality of wavelengths, a compensator suitable for a measurement wavelength region should be made but is difficult to manufacture. In addition, since phase retardation values of the compensator are different for each wavelength, the phase retardation values should be found through a calibration process before being used for measurement, but a calibration method is very complex, having a problem of occurrence of an error during a calibration process.

Referring to FIG. 2, a dual compensator-rotation-type normal incidence ellipsometer 20, which is another exemplary embodiment of the normal incidence ellipsometer of the related art, includes a light source 21, a beam splitter 22, a linear polarizer 23, a first constantly rotating compensator 24a, a first waveplate 24aw, a first constantly rotating hollow shaft motor 24am, a second constantly rotating compensator 24b, a second waveplate 24bw, a second constantly rotating hollow shaft motor 24bm, a spectroscope 25, a processor 26, a shielding booth 27, and a gas supply device 28. Unlike the single compensator-rotation type normal incidence ellipsometer 10, the dual compensator-rotation-type normal incidence ellipsometer 20 further includes a second constantly rotating compensator 24b, the first waveplate 24aw, and the second waveplate 24bw in order to further widen a measurement wavelength region. In addition, since light having a wavelength smaller than a wavelength range of deep UV is easily absorbed by oxygen, moisture, etc. in a path of a measurement beam, and thus in order to prevent this, the measurement optical system is shielded with the shielding booth 27 and a purging system for filling the measurement beam path with gas such as high-purity nitrogen or high-purity argon using the gas supply device 28 is further provided.

The dual compensator-rotation-type normal incidence ellipsometer 20 of FIG. 2 in terms of a basic structure of a measurement principle will be described as follows. An incident collimated beam L20a emitted from the light source 21 is incident on the fixed polarizer (implemented as a linear polarizer 23) in a direction perpendicular to a surface of a sample 1000 by the beam splitter 22. The incident collimated beam L20a incident on the fixed polarizer is modulated in a polarization state of the incident collimated beam, while sequentially passing through the fixed polarizer, a first constantly rotating incidence axis compensator (implemented as the first constantly rotating compensator 24a), and a second constantly rotating incidence axis compensator (implemented as the second constantly rotating compensator 24b) on the incident light axis, and is incident on the sample 1000 (L20b). A reflected collimated beam L20c reflected by the sample 1000 is modulated in the polarization state of the reflected collimated beam, while sequentially passing through the first constantly rotating reflection axis compensator (also implemented as the second constantly rotating compensator 24b), the second constantly rotating reflection axis compensator (also implemented as the first constantly rotating compensator 24a), and the fixed analyzer (also implemented as the linear polarizer 23) on the reflected light axis, and is incident on the spectrometer 25 by the beam splitter 22 (L20d). The reflected collimated beam L20d incident on the spectrometer 25 is divided by each wavelength L20d and converted into an electrical digital signal value by a photodetector element embedded in the spectrometer 25, and the measured digital signal values are used for the optical property analysis of the sample 1000 by the processor 26.

In the exemplary embodiment of FIG. 2, the linear polarizer 23 serves as a fixed analyzer as well as a fixed polarizer. In addition, in the exemplary embodiment of FIG. 2, the first constantly rotating compensator 24a and the first waveplate 24aw serve not only as the first constantly rotating incidence axis compensator but also as the second constantly rotating reflection axis compensator, and the second constantly rotating compensator 24b and the second wavelength plate 24bw of FIG. 2 serve not only as the second constantly rotating incident axis compensator but also as the first constantly rotating reflection axis compensator. This configuration has the advantage of reducing the size of the measuring device to be smaller than the oblique incidence type.

However, the dual compensator-rotation-type normal incidence ellipsometer 20 also involves the complexity of manufacturing and calibration occurring due to the wavelength dependence of the compensators and the waveplates, like the single compensator-rotation-type normal incidence ellipsometer 10.

To sum up, the ellipsometer basically includes a polarization state generator (PSG) and a polarization state analyzer (PSA). In the case of the normal incidence ellipsometer of the related art, one fixed linear polarizer and one or two constantly rotating compensators are used as components specifically realizing the PSG and the PSA. However, since such a compensator has a wavelength dependence in which relative phase retardation has a different value depending on a wavelength, equipment calibration is essential, and here, there is a problem that an error may occur in the process of performing a complicated calibration procedure. In addition, if it is intended to increase a measurement wavelength region to be wider to enhance reliability of measurement, a compensator suitable therefor needs to be newly developed.

RELATED ART DOCUMENT

Patent Document (Patent document 1) 1. U.S. Pat. No. 7,355,708 ("Normal incidence rotating compensator ellipsometer", Apr. 8, 2008)

(Patent document 2) 2. U.S. Patent No. 7,889,340 ("Normal incidence ellipsometer with complementary waveplate rotating compensators ", Feb. 15, 2011)

Non-Patent Document (Non-patent document 1) 1. R.M.A. Azzam, "PIE: Perpendicular-Incidence Ellipsometry—Application to the Determination of the Optical Properties of Uniaxial and Biaxial Absorbing Crystals," Opt. Commun. 19, 122 (1976).

(Non-patent document 2) 2. R.M.A. Azzam, "NIRSE: Normal incidence Rotating-Sample Ellipsometer," Opt. Commun. 20, 405 (1977).

(Non-patent document 3) 3. Y. J. Cho, et. Al., "Universal Evaluations and Expressions of Measuring Uncertainty for Optical element rotation type Spectroscopic Ellipsometers," Opt. Express 23, 15481 (2015).

DISCLOSURE

Technical Problem

An object of the present invention is to provide a normal incidence ellipsometer and a method for measuring optical properties of a sample using the same, capable of simplifying an equipment calibration procedure and easily realizing expansion of a measurement wavelength region by replacing a wavelength-dependent compensator with a linear polarizer without wavelength dependence.

Technical Solution

In one general aspect, a normal incidence ellipsometer may include: a light source including a collimating optical system and emitting an incident collimated beam toward a sample; a beam splitter disposed between the light source and the sample and directing a portion of the incident collimated beam in a direction perpendicular to a surface of the sample; a fixed polarizer disposed between the beam splitter and the sample and fixed at a preset azimuthal angle to allow only a linearly polarized component of the incident collimated beam in a preset direction to pass therethrough; a constantly rotating polarizer disposed between the fixed polarizer and the sample and rotating at a constant speed to regularly modulate a polarization state of the incident collimated beam according to a constant rotational frequency; a photodetector element measuring an exposure of a spectral radiant flux upon receiving a reflected collimated beam reflected from the sample; a constantly rotating analyzer disposed between the sample and the photodetector element and rotating at a constant speed to regularly modulate a polarization state of the reflected collimated beam according to a constant rotational frequency; a fixed analyzer disposed between the constantly rotating analyzer and the photodetector element and fixed at a preset azimuthal angle to allow only a linearly polarized component of the reflected collimated beam in a preset direction to pass therethrough; and a processor controlling the azimuthal angles of the fixed polarizer and the fixed analyzer, the constant angular velocities of the constantly rotating polarizer and the constantly rotating analyzer and calculating optical properties of the sample by analyzing the exposure value of the spectral radiant flux measured by the photodetector element, wherein the fixed polarizer and the fixed analyzer are integrally formed as one linear polarizer and the constantly rotating polarizer and the constantly rotating analyzer are integrally formed as one constantly rotating linear polarizer.

Here, the beam splitter, the fixed polarizer, and the fixed analyzer may be integrally formed as one beam splitting linear polarizer. Also, here, the beam splitting linear polarizer may be a Wollaston Prism.

In addition, the photodetector element may be at least one selected from pixels for a specified wavelength band or binned pixels in a spectrometer including a charge coupled device (CCD), a complementary metal oxide semiconductor (CMOS), or a photodiode array device in which pixels are arranged in a linear or two-dimensional (2D) planar structure. Also, here, the photodetector element may be at least one selected from pixels for a specified wavelength band or binned pixels in one spectrometer or in a spectrometer set including an s-polarized spectrometer and a p-polarized spectrometer.

Alternatively, the photodetector element may be a single point photodetector including a photomultiplier tube (PMT) and a photodiode when the light source is a light source device having a single wavelength. The light source device having a single wavelength may be at least one selected from a gas laser and a laser diode.

Alternatively, the photodetector element may be one pixel selected from an imaging photodetector including a CCD or CMOS in which color filters and pixels allowing light having a designated wavelength band to transmit therethrough are arranged in a 2D planar structure.

In addition, a hollow shaft stepping motor for azimuthal angle adjustment may be provided in the fixed polarizer and the fixed analyzer, and a constantly rotating hollow shaft motor for constant angular velocity adjustment may be provided in the constantly rotating polarizer and the constantly rotating analyzer.

In addition, the processor may include: a calculation unit calculating Fourier coefficient values for a spectral radiant flux waveform from exposure values of the spectral radiant flux of light measured by the photodetector element, calculating Mueller-matrix element values of the sample from the Fourier coefficient value, and analyzing and calculating optical property values of the sample from the Mueller-matrix element values; a controller remotely controlling the azimuthal angles of the fixed polarizer and the fixed analyzer using a hollow shaft stepping motor and remotely controlling the constant angular velocities of the constantly rotating polarizer and the constantly rotating analyzer using a constant rotation hollow shaft motor; a storage unit storing measured values which are the exposure values of the spectral radiant flux, the calculated values which are the Fourier coefficient values and the Mueller-matrix element values, and analysis values which are the optical property values of the sample; and an output unit outputting the measured values, the calculated values, and the analysis values.

In addition, the light source may be at least one selected a xenon lamp, a tungsten-halogen lamp, a deuterium lamp, a laser driven light source, a gas laser, and a laser diode, or light emitted therefrom may be transmitted through an optical fiber.

In addition, the normal incidence ellipsometer may further include: a shielding booth shielding an optical path from outside atmosphere; and a gas supply device connected to the shielding booth to supply an inert gas. Here, the inert gas may be a nitrogen gas or an argon gas.

In addition, the normal incidence ellipsometer may further include: a focusing optical system disposed between the constantly rotating polarizer and the sample and causing the incident collimated beam to be converged to focus on a local area of the sample. Here, the focusing optical system may be one selected from at least one mirror, at least one lens, or a set of at least one mirror and at least one lens in order to correct chromatic aberration for a broadband wavelength. In addition, here, in the focusing optical system, the mirror or the lens may be coated with a single thin film or a multilayer thin film to improve transmission or reflection efficiency.

In addition, the normal incidence ellipsometer may further include: a sample transport system including a sample storage container accommodating and storing a plurality of samples and a sample transport device sequentially drawing out the plurality of samples from the sample storage container one by one according to a preset rule, arranging the drawn sample on a sample holder of the normal incidence ellipsometer, and returning a measurement-completed sample to its original location of the sample storage container.

In addition, the normal incidence ellipsometer may further include: a sample aligning system including an alignment laser emitting light for sample alignment, an alignment optical system causing light emitted from the laser to be incident on the sample in a preset direction, and an alignment photodetector receiving light reflected after being incident on the sample and determining a location of the sample.

In addition, the normal incidence ellipsometer may further include: a vibration suppression system provided at a lower portion of the normal incidence ellipsometer to prevent an influence of vibration of a measurement environment.

In addition, the normal incidence ellipsometer may further include: a thermostat or a cooling device maintaining a measurement environment temperature or performing cooling to prevent an occurrence of a measurement error due to a temperature change.

In another general aspect, a method for measuring optical properties of a sample using the normal incidence ellipsometer may include: a sample mounting operation in which the sample whose optical properties are intended to be measured is mounted and aligned on the sample holder of the normal incidence ellipsometer; an azimuthal angle selecting operation in which azimuthal angle values of the fixed polarizer and the fixed analyzer are selected by the processor; an azimuthal angle moving operation in which the fixed polarizer and the fixed analyzer are moved to set azimuthal angles by the processor; an exposure measuring operation in which exposure values of spectral radiant fluxes of the reflected collimated beam according to the change in the azimuthal angles of the constantly rotating polarizer and the constantly rotating analyzer are measured by the photodetector element; a Fourier coefficient calculating operation in which Fourier coefficient values of a spectral radiant flux waveform are calculated from the exposure values of the spectral radiant fluxes by the processor; a Mueller-matrix element value calculating operation in which Mueller-matrix element values of the sample are calculated from the Fourier coefficient values by the processor; and a sample optical property analyzing operation in which optical property values of the sample are analyzed and calculated from the Mueller-matrix element values by the processor.

Here, the optical properties may be at least one selected from interfacial properties, a thin film thickness, a complex refractive index, a nano-shape, anisotropic properties, surface roughness, a composition ratio, and crystallinity.

Advantageous Effects

According to the exemplary embodiment of the present invention, the use of the linear polarizer without wavelength dependence as a device for analyzing a polarization state in configuring the normal incidence ellipsometer may have a significant effect of resolving various problems that have occurred with the compensator having wavelength dependence at a time. More specifically, according to the present invention, there is an effect of simplifying the equipment calibration procedure by excluding wavelength dependence, and accordingly, there is an effect of significantly reducing the occurrence of an error in the complicated equipment calibration procedure. In addition, in the related art, in order to expand the measurement wavelength region, a compensator suitable therefor should be newly developed, but in the present invention, there is no need to do so, and thus, it is more free to expand the measurement wavelength region. In addition, according to the present invention, as the measurement wavelength region is expanded, measurement reliability of the normal incidence ellipsometer may be eventually improved.

Detailed Description of Main Elements

Figure 1:
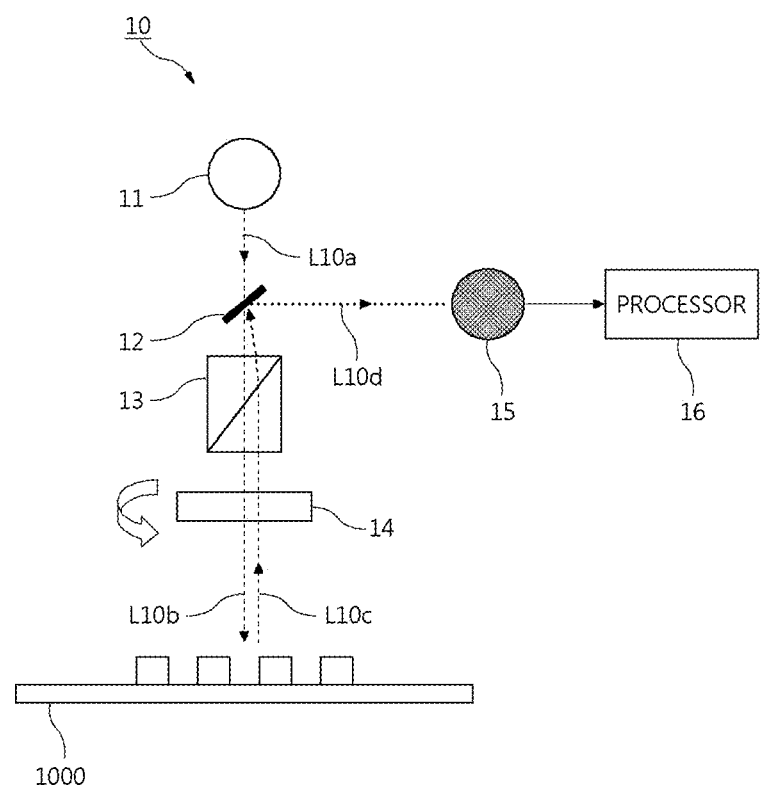
FIG. 1 is a schematic diagram of a single compensator-rotation type normal incidence ellipsometer of the related art.

10: single compensator-rotation type normal incidence ellipsometer (of related art)
11: light source
13: linear polarizer
15: spectrometer
L10a: incident collimated beam emitted from light source
L10b: incident collimated beam incident on sample
L10c: reflected collimated beam reflected by sample
L10d: reflected collimated beam incident on spectrometer
20: dual compensator-rotation type normal incidence ellipsometer (of related art)
21: light source
23: linear polarizer
24a: first constantly rotating compensator
24am: first constant speed hollow shaft motor
24b: second constantly rotating compensator
24bm: second constant speed hollow shaft motor
25: spectrometer
27: shielding booth
L20a: incident collimated beam emitted from light source
L20b: incident collimated beam incident on sample
L20c: reflected collimated beam reflected by sample
L20d: reflected collimated beam incident on spectrometer
100: linear polarizer-rotation type normal incidence ellipsometer of first exemplary embodiment of present invention
101: light source
103: linear polarizer
104: constantly rotating linear polarizer
105: photodetector element
107: shielding booth
109: focusing optical system
L100a: incident collimated beam emitted from light source
L100b: incident collimated beam incident on sample
L100c: reflected collimated beam reflected by sample
L100d: reflected collimated beam incident on photodetector element
200: linear polarizer-rotation type normal incidence ellipsometer of second exemplary embodiment of present invention
201: light source
204: constantly rotating linear polarizer
205: photodetector element
L200a: incident collimated beam emitted from light source 12: beam splitter
14: constantly rotating compensator
16: processor 22: beam splitter 24aw: first waveplate 24bw: second waveplate 26: processor
28: gas supply device 102: beam splitter
103m: hollow shaft stepping motor
104m: constantly rotating hollow shaft motor
106: processor
108: gas supply device 203: beam splitting linear polarizer
204m: constantly rotating hollow shaft motor
206: processor

Detailed Description of Main Elements

L200d: reflected collimated beam incident on photodetector element
300: linear polarizer-rotation type normal incidence ellipsometer of third exemplary embodiment of present invention
301: light source
302: beam splitter
303: beam splitting linear polarizer
304: constantly rotating linear polarizer
304m: constantly rotating hollow shaft motor
305s: s-polarized light photodetector element
305p: p-polarized light photodetector element
306: processor
L300a: incident collimated beam emitted from light source
L300s: reflected collimated beam incident on s-polarized light photodetector element
L300p: reflected collimated beam incident on p-polarized light photodetector element
1000: sample

BEST MODE

Hereinafter, a normal incidence ellipsometer having the configuration as described above and a method for measuring optical properties of a sample using the same according to the present invention will be described in detail with reference to the accompanying drawings.

[Basic Configuration of Normal Incidence Ellipsometer of Present Invention]

Figure 3:
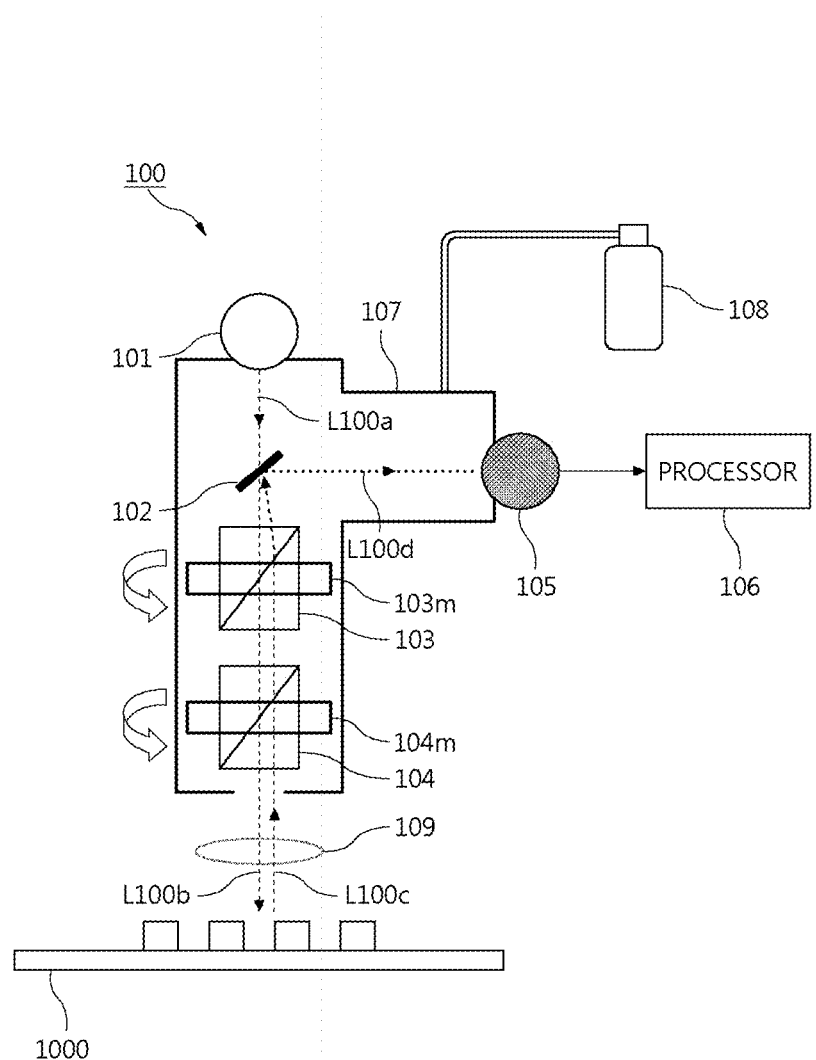
FIG. 3 is a schematic diagram of a linear polarizer-rotation type normal incidence ellipsometer according to a first exemplary embodiment of the present invention.
Figure 4:
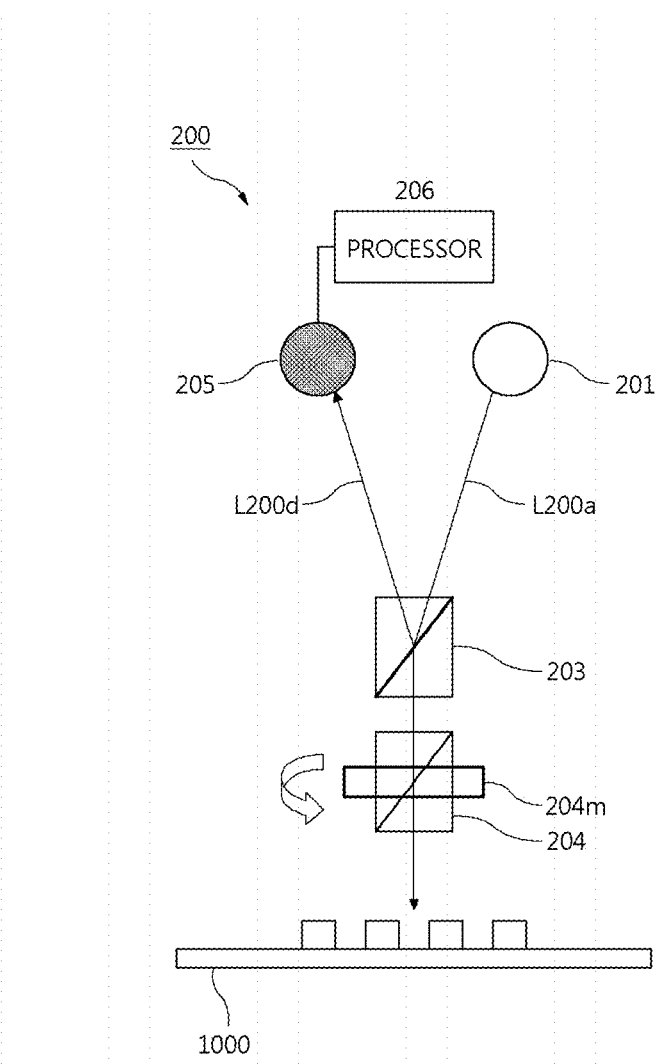
FIG. 4 is a schematic diagram of a linear polarizer-rotation type normal incidence ellipsometer according to a second exemplary embodiment of the present invention.
Figure 5:
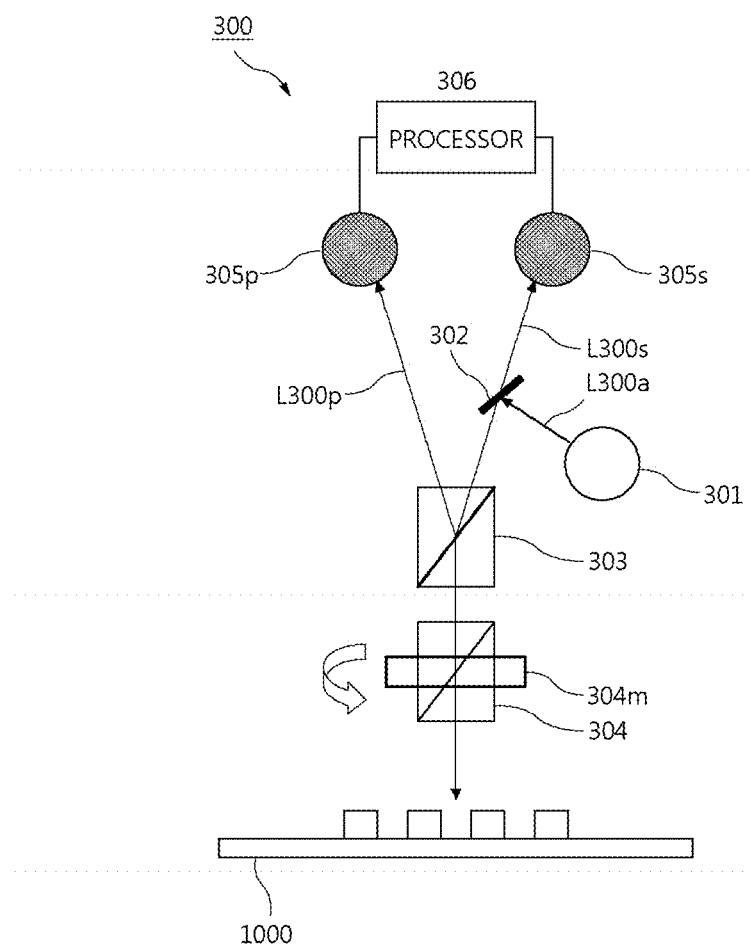
FIG. 5 is a schematic diagram of a linear polarizer-rotation type normal incidence ellipsometer according to a third exemplary embodiment of the present invention.

In the present invention, the problems of the related art as described above are solved by replacing a compensator having wavelength dependence with a linear polarizer without wavelength dependence. Several exemplary embodiments of the normal incidence ellipsometer of the present invention are shown in FIGS. 3 to 5, and each exemplary embodiment will be described in more detail later. The normal incidence ellipsometer of the present invention basically includes a light source, a beam splitter, a fixed polarizer, a constantly rotating polarizer, a photodetector element, a constantly rotating analyzer, a fixed analyzer, and a processor. Each part will be described as follows.

The light source including a collimator serves to radiate an incident collimated beam toward the sample. Here, the light source may be at least one selected from a xenon lamp, a tungsten-halogen lamp, a deuterium lamp, a laser driven light source, a gas laser, and a laser diode, or light emitted therefrom may be transmitted through an optical fiber.

The beam splitter is disposed between the light source and the sample and serves to direct a portion of the incident collimated beam in a direction perpendicular to a surface of the sample.

The fixed polarizer is disposed between the beam splitter and the sample and is fixed at a preset azimuthal angle to allow a linearly polarized component of the incident collimated beam in a preset direction to pass therethrough. Here, the azimuthal angle of the fixed polarizer is not always fixed and the fixed polarizer itself is movable so as to be adjusted to a desired azimuthal angle when measuring the sample; however, since the fixed polarizer is fixed at the time of measurement, the term "fixed" is used. Here, in order to adjust the azimuthal angle of the fixed polarizer, a hollow shaft stepping motor may be provided in the fixed polarizer.

The constantly rotating polarizer is disposed between the fixed polarizer and the sample and rotates at a constant speed to serve to regularly modulate a polarization state of the incident collimated beam according to a constant rotational frequency. Here, in order to adjust a constant angular velocity of the constantly rotating polarizer, a constantly rotating hollow shaft motor may be provided in the constantly rotating polarizer.

The photodetector element serves to measure an exposure of a spectral radiant flux upon receiving a reflected collimated beam reflected from the sample. Here, the photodetector element may be at least one selected from pixels for a specified wavelength band or binned pixels in a spectrometer including a charge coupled device (CCD), a complementary metal oxide semiconductor (CMOS), or a photodiode array device in which pixels are arranged in a linear or two-dimensional (2D) planar structure. Also, here, the photodetector element may be at least one selected from pixels for a specified wavelength band or binned pixels in one spectrometer or in a spectrometer set including an s-polarized spectrometer and a p-polarized spectrometer.

In detail, when the light source uses white light, a spectroscope may be used as a means for detecting light, and here, what substantially detects light is each pixel or each binned pixel group in a photodetector array provided in the spectrometer. That is, it may be understood that each pixel or each binned pixel group, rather than the spectrometer itself, serves as a photodetector element.

Alternatively, the photodetector element may be a single point photodetector including a photomultiplier tube (PMT) and a photodiode when the light source is a light source device having a single wavelength. The light source device having a single wavelength may be at least one selected from a gas laser and a laser diode. Alternatively, the photodetector element may be one pixel selected from an imaging photodetector including a CCD or CMOS in which pixels are arranged in a 2D planar structure. Here, if the light source is a light source device having a single wavelength, other components are not required, but if the light source is a multi-wavelength light source device having multiple wavelengths, color filters allowing light having a designated wavelength band to transmit therethrough may be further provided between the light source and the photodetector element (including pixels of an imaging photodetector including the CCD or CMOS).

The photodetector element is maintained in a standby state before an external trigger is transmitted, and when the external trigger is transmitted, the photodetector element performs measurement. If the photodetector element is one pixel or binned pixels selected from an integrating photodetector such as a CCD, CMOS, or photodiode array of a spectrometer, each photodetector element operates in a manner of outputting or temporarily storing an exposure value during a designated integration time, and if the photodetector element is a non-integral photodetector such as a photodetector including a PMT or a photodiode, the photodetector may operate in a manner of outputting or temporarily storing an exposure value during a very short integration time, i.e., a spectral radiant flux value of light approximately.

The constantly rotating analyzer is disposed between the sample and the photodetector element and rotates at a constant speed to regularly modulate a polarization state of the reflected collimated beam according to a constant rotational frequency. Here, since the constantly rotating analyzer has a different role from the above constantly rotating polarizer, a separate name is used. As described above, in the case of the oblique-incidence type, the constantly rotating analyzer and the constantly rotating polarizer are implemented as separate components in actuality, but in the case of the normal incidence type, the constantly rotating analyzer and the constantly rotating polarizer may be implemented as one component (accordingly, the normal incidence ellipsometer may make the device compact, compared with the oblique-incidence ellipsometer, as described above). That is, in the present invention, the constantly rotating polarizer and the constantly rotating analyzer are integrally formed as one constantly rotating linear polarizer.

The fixed analyzer is disposed between the constantly rotating analyzer and the photodetector element and is fixed at a preset azimuthal angle to allow only linearly polarized component of the reflected collimated beam in a preset direction to pass therethrough. Like the fixed polarizer, the fixed analyzer itself is movable but is fixed during measurement, so the term 'fixed' is used. In addition, like the constantly rotating polarizer and the constantly rotating analyzer, the fixed polarizer and the fixed analyzer are integrally formed as one linear polarizer. Furthermore, in order to further miniaturize and integrate the device, the beam splitter, the fixed polarizer, and the fixed analyzer may be integrally formed as one beam splitting linear polarizer. Here, the beam splitting linear polarizer may be formed of a Wollaston prism.

The processor serves to control the azimuthal angles of the fixed polarizer and the fixed analyzer and the constant angular velocities of the constantly rotating polarizer and the constantly rotating analyzer, and analyze an exposure value of the spectral radiant flux measured by the photodetector element to calculate optical properties of the sample. Specifically, the processor includes a calculation unit performing various calculations, a controller controlling driving of various components described above, a storage unit storing values required for calculation, and an output unit outputting an analysis result. The calculation unit may calculate Fourier coefficient values for a spectral radiant flux waveform from the exposure values of the spectral radiant flux of light measured by the photodetector element, calculate Mueller-matrix element values of the sample from the Fourier coefficient values, and analyze and calculate optical property values of the sample from the Mueller-matrix element values. The controller may remotely control the azimuthal angles of the fixed polarizer and the fixed analyzer using a hollow shaft stepping motor, and remotely control the constant angular velocities of the constantly rotating polarizer and the constantly rotating analyzer using the constant speed rotation hollow shaft motor. The storage unit stores values required for calculations performed by the calculation unit, that is, the exposure value (measured value) measured from the photodetector element, the Fourier coefficient value for the spectral radiant flux waveform, the Mueller-matrix element value (calculated value), and the optical property value (analysis value) of the sample. The output unit outputs the measured value, the calculated value, and the analysis value in a form desired by the user, such as a screen or a printout, through a monitor or a printing device.

In addition, the normal incidence ellipsometer of the present invention may further include a shielding booth for shielding an optical path from the outside atmosphere and a gas supply device connected to the shielding booth to supply an inert gas such as a nitrogen gas, an argon gas, etc. Accordingly, a problem in which light of a specific wavelength is absorbed by moisture, oxygen, etc. may be effectively prevented, and ultimately, a measurement wavelength region may be smoothly expanded as described above.

Figure 2:
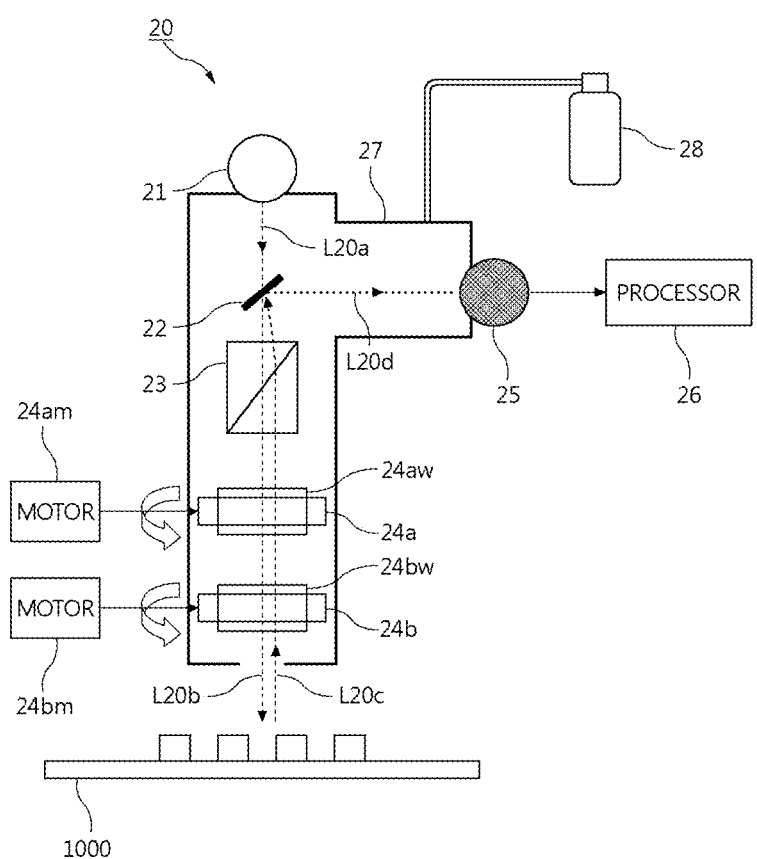
FIG. 2 is a schematic diagram of a dual-compensator-rotation type normal incidence ellipsometer of the related art.

In the normal incidence ellipsometer of the present invention configured as described above, the constantly rotating compensator is replaced with the constantly rotating linear polarizer, unlike the ellipsometer of the related art shown in FIG. 1 or 2. The compensator used in the ellipsometer of the related art has wavelength dependence in which a phase retardation value of the compensator varies for each wavelength as described above, and thus requires a complicated calibration procedure, and there is a problem in that an error occurs during such calibration procedure. However, according to the present invention, by removing the compensator itself and replacing the compensator with the linear polarizer without wavelength dependence, such a calibration procedure itself may be significantly simplified and an occurrence of a resultant error may also be fundamentally excluded.

Specifically, in the normal incidence ellipsometer of the present invention, the linear polarizer (role of the fixed polarizer and the fixed analyzer) serves to remove a polarization state error that may occur by the light source and the beam splitter on an incident collimated beam axial line and a polarization state error that may occur by the beam splitter and a detection optic system on a reflected collimated beam axial line. In addition, the constantly rotating linear polarizer (role of the constantly rotating polarizer and the constantly rotating analyzer) serves to regularly modulate the polarization states of the incident collimated beam and the reflected collimated beam according to a constant rotational frequency. In this manner, since the normal incidence ellipsometer of the present invention does not use the polarization optical element having wavelength dependence, the equipment calibration procedure is very simple, so that it is easy to match between equipment, and the measurement wavelength region may be easily expanded to a broadband to improve measurement reliability.

[Additional Configuration of Normal Incidence Ellipsometer of Present Invention]

The normal incidence ellipsometer of the present invention may further include additional components such as a focusing optical system, a sample transport system, a sample alignment system, a vibration suppression system, a thermostat or a cooling device to improve measurement accuracy and user convenience.

When the normal incidence ellipsometer is used in a field such as a semiconductor industry, a size of a region to be measured in the sample is very small, such as tens of micrometers, and thus the focusing optical system may be selectively provided in a front path of the sample so that incident light may be smoothly focused on a local region of the sample. That is, the focusing optical system is disposed between the constantly rotating polarizer and the sample and serves to converge the incident collimated beam so as to be focused on a local region of the sample. Specifically, the focusing optical system may be formed of one selected from at least one mirror, at least one lens, or a set of at least one mirror and at least one lens in order to correct chromatic aberration for a broadband wavelength. Here, in order to improve transmission or reflection efficiency, the mirror or the lens may be coated with a single thin film or a multilayer thin film.

Meanwhile, when the normal incidence ellipsometer is used in the semiconductor industry field, it is important to measure a plurality of wafer samples within a short time, and to this end, the sample transport system may be provided. Specifically, the sample transport system may include a sample storage container accommodating and storing a plurality of samples and a sample transport device sequentially drawing out the plurality of samples from the sample storage container one by one according to a preset rule, arranging the drawn sample on a sample holder of the normal incidence ellipsometer, and returning a measurement-completed sample to its original location of the sample storage container. Here, the sample holder may be formed of six degrees of freedom system including a parallel movement of three degrees of freedom of moving up and down and moving left or right and a tilt adjustment and rotation function having two degrees of freedom so that the sample may be freely aligned and smoothly changed in a measurement position.

In addition, the sample alignment system may be provided to allow the sample to be aligned more accurately and quickly in the process of measuring within such a short time. Specifically, the sample alignment system may include an alignment laser that emits light for sample alignment, an optical system for alignment that allows light emitted from the laser to be incident on the sample in a preset direction, and a photodetector for alignment that determines a position of the sample upon receiving light reflected after being incident on the sample.

In addition, the vibration suppression system may be provided at a lower portion of the normal incidence ellipsometer to prevent an influence of vibration of a measurement environment. In addition, in order to prevent an occurrence of a measurement error due to temperature change, the thermostat may be provided in the light source, the polarizing optical elements, the sample, and the photodetector element to maintain a temperature of the measurement environment or the cooling device may be provided in the photodetector element to perform cooling.

[Multiple Exemplary Embodiments of Normal Incidence Ellipsometer of Present Invention]

FIG. 3 shows a schematic diagram of a linear polarizer-rotation type normal incidence ellipsometer according to a first exemplary embodiment of the present invention. A linear polarizer-rotation type normal incidence ellipsometer 100 of the first exemplary embodiment of the present invention includes a light source 101, a beam splitter 102, a linear polarizer 103, a hollow shaft stepping motor 103$m$, a constantly rotating linear polarizer 104, a constantly rotating hollow shaft motor 104$m$, a photodetector element 105, and a processor 106. In the first exemplary embodiment, the linear polarizer 103 in the description of the basic configuration serves as both the fixed polarizer and the fixed analyzer, and the constantly rotating linear polarizer 104 serves as both the constantly rotating polarizer and the constantly rotating analyzer.

In addition, as described above, the normal incidence ellipsometer 100 of the first exemplary embodiment may include a shielding booth 107 for expanding the measurement wavelength range and a gas supply device 108 and may include the focusing optical system 109 to smoothly focus on a local area of the sample 1000.

FIG. 4 shows a schematic diagram of a linear polarizer-rotation type normal incidence ellipsometer according to a second exemplary embodiment of the present invention. A linear polarizer-rotation type normal incidence ellipsometer 200 of the second exemplary embodiment of the present invention includes a light source 201, a beam splitting linear polarizer 203, a constantly rotating linear polarizer 204, a constantly rotating hollow shaft motor 204$m$, a photodetector element 205, and a processor 206. In the second exemplary embodiment, the beam splitting linear polarizer 203 plays the roles of all of the beam splitter, the fixed polarizer, and the fixed analyzer in the description of the basic configuration, so that the equipment may be further miniaturized and integrated.

In FIG. 4, a shielding booth, a gas supply device, a focusing optical system, etc. are not shown, but these components are additionally provided in the second exemplary embodiment of FIG. 4 (and in a third exemplary embodiment of FIG. 5 to be described later).

FIG. 5 shows a schematic diagram of a linear polarizer-rotation type normal incidence ellipsometer according to the third exemplary embodiment of the present invention. A linear polarizer-rotation type normal incidence ellipsometer 300 of the third exemplary embodiment of the present invention includes a light source 301, a beam splitter 302, a beam splitting linear polarizer 303, a constantly rotating linear polarizer 304, a constantly rotating hollow shaft motor 304$m$, an s-polarized photodetector element 305$s$, a p-polarized photodetector element 305$p$, and a processor 306. In the third exemplary embodiment, the s-polarized photodetector element 305$s$ and the p-polarized photodetector element 305$p$ serve as the photodetector element in the description of the basic configuration. Meanwhile, in the third exemplary embodiment, the beam splitting linear polarizer 303 plays the roles of all of the beam splitter, the fixed polarizer, and the fixed analyzer in the description of the basic configuration. Here, the beam splitter 302 is further provided to form an optical path that directs light emitted from the light source 301 toward the sample 1000 as can be seen from FIG. 5.

In addition, in the linear polarizer-rotation type normal incidence ellipsometer of the present invention, rotation of the constantly rotating linear polarizer by the constantly rotating hollow shaft motor of a polarization element may be one selected from constant speed rotation or step rotation.

[Principle of Measuring Optical Properties of Sample Using Normal Incidence Ellipsometer of Present Invention]

The principle of measuring optical properties of the sample using the normal incidence ellipsometer of the present invention configured as described above will be described in detail as follows. As for azimuthal angles for the fixed polarizer, the constantly rotating polarizer, the constantly rotating analyzer, and the fixed analyzer used in the normal incidence ellipsometer of the present invention, positions of a transmission axis of the linear polarizer at the fixed polarizer, a transmission axis of the linear polarizer at the constantly rotating polarizer, a transmission axis of the linear polarizer at the constantly rotating analyzer, and a transmission axis of the linear polarizer at the fixed analyzer are described as P, $P_r$, $A_r$, and A based on a position of an arbitrarily selected reference axis.

An arbitrary spectral radiant flux waveform function $I_{ex}(t)$ having a period of $T(=2\pi/\omega)$ is represented as a function of time (t) by the following equation.

$$I_{ex}(t) = I'_0 + \sum_{n=1}^{N_{ho}} [A'_n \cos(n\omega t) + B'_n \sin(n\omega t)] \quad (1)$$

Here, a direct current (dc) component $I_0'$ among Fourier coefficient components of the spectral radiant flux waveform, alternating current (ac) components ($A'_n, B'_n$) among the Fourier coefficient components of the spectral radiant flux waveform, and an angular velocity $\omega$, $N_{ho}$ of constantly rotating polarization are the largest index value among the Fourier coefficient components which are not 0.

Therefore, the spectral radiant flux value at a polychromatic wavelength measured by the photodetector element at time t in an ideal linear polarizer-rotation type normal incidence ellipsometer without an error may be expressed as an equation for the following general waveform.

$$I(t) = I'_0 + \sum_{n=1}^{N_{ho}} [A'_n \cos(n\omega t) + B'_n \sin(n\omega t)] \quad (2)$$

Here, $I_0'$ is the direct current component of the Fourier coefficient, $A'_n$ and $B'_n$ are the AC components of the Fourier coefficient, $\omega(=2\pi/T)$ is the angular velocity of the constantly rotating linear polarizer rotating at a constant speed, and $N_{ho}$ is the highest index value among the AC components of the non-zero Fourier coefficient.

It is very important for the linear polarizer-rotation type normal incidence ellipsometers to accurately measure the Fourier coefficient of the spectral radiant flux waveform using the photodetector element. State-of-the-art real-time spectroscopic ellipsometers use, as a photodetector, a charge coupled device (CCD) or a photo diode array (PD array) capable of collecting a spectrum of Fourier coefficients as quickly as possible for real-time measurement with high precision. Each pixel or each binned pixel group of the CCD or PD array serves as the one photodetector element. An output signal of the CCD or PD array is proportional to an integration time as well as the spectral radiant flux, and thus the CCD or PD array is called an integrating photodetector.

The data measurement process of the CCD or the PD array may be classified into a frame acquisition process and a frame reading process. One reference pulse may be generated per measurement period, that is, one rotation by the constant angular velocity in the constant speed rotation optical element system rotating at a constant speed, i.e., a rotation period $T(=2\pi/\omega)$ with respect to the constant angular velocity and J constant clock pulses may be generated at an equal interval of T/J. The reference pulse is a reference time indicating starting of measurement by the ellipsometer and the constant clock pulse may be transferred as the external trigger for data measurement by the CCD or PD array. After the constant clock pulse is transferred to the CCD or PD array as the external trigger, the detailed process of the data measurement by the CCD or PD array for the time of the period T may be progressed in a series of order as follows. If one photodetector element in each pixel or each binned pixel group of the CCD or PD array performs a process of measuring an exposure which stores, as photoelectrons, photons of incident light for the integration time $T_i$ after a time delay for $T_d$, prior to starting the exposure after receiving the constant clock pulse as the external trigger and then performs the frame acquisition process for converting the measured exposure into an electrical signal, there is a standby time waiting to receive the next constant clock pulse. Therefore, the measured exposure data may be expressed by the integration of a next waveform.

$$S_j = \int_{(j-1)T/J+T_d}^{(j-1)T/J+T_d+T_i} I(t)dt, \; (j=1, \ldots, J) \quad (3)$$

An equation of the exposure measured based on Equations (2) and (3) is derived to the following form.

$$S_j = T_i I'_0 + \quad (4)$$

$$\sum_{n=1}^{N_{ho}} \frac{T_i}{\xi_n} \sin\xi_n \cos\left[\frac{2n\pi(j-1)}{J}\right] \left\{ A'_n \cos\left[\xi_n\left(1+\frac{2T_d}{T_i}\right)\right] + B'_n \sin\left[\xi_n\left(1+\frac{2T_d}{T_i}\right)\right] \right\} -$$

$$\sum_{n=1}^{N_{ho}} \frac{T_i}{\xi_n} \sin\xi_n \sin\left[\frac{2n\pi(j-1)}{J}\right] \left\{ A'_n \sin\left[\xi_n\left(1+\frac{2T_d}{T_i}\right)\right] - B'_n \cos\left[\xi_n\left(1+\frac{2T_d}{T_i}\right)\right] \right\}.$$

Here, $\xi_n = n\pi T_i/T$. In the above Equation (4), J exposure sets measured for the time T form a group of a linear equation consisting of $2N_{ho}+1$ unknown Fourier coefficients of the above Equation (2), which may be simply expressed by $S=\Xi X'$. Here, $S=(S_1, \ldots, S_J)^T$ representing the exposure and $X'=(I'_0, A'_1, B'_1, \ldots, A'_{N\,ho}, B'_{N\,ho})T$ representing the Fourier coefficients are a column vector and $\Xi$ is a coefficient matrix of J-by-($2N_{ho}+1$). If a least squares method is used in a case where J is one of elements of a union of integer sets of $\{J \geq 2N_{ho}+1,$ for odd $J\}$ and $\{J \geq 4N_{ho}+2,$ for even $J\}$, a solution to calculate a Fourier coefficient X' from the exposure S like $X'=(\Xi^T\Xi)^{-1}\Xi^T S$ may be obtained.

When a discrete Fourier transform is applied to the exposures measured as in Equation (4), the result is the same as the result obtained by the least squares method but the expression method thereof may be simpler as follows.

$$\langle H_n^c \rangle + i\langle H_n^s \rangle = \frac{2}{NJ} \sum_{j=1}^{NJ} S_j \exp\left[i\frac{2n\pi(j-1)}{J}\right] \quad (5)$$

Here, $\langle H_n^c \rangle \langle H_n^s \rangle$ are a real-valued function and angle brackets represent an average value for measurement values obtained by performing a measurement in a total of N times when the measurement is performed once every rotation period of the reference angular velocity. Arranging the above Equation by substituting Equation (4) into Equation (5) and using orthogonality of a trigonometric function system, average values of the measured Fourier coefficients may be obtained as follows.

$$\langle I'_0 \rangle = \frac{\langle H_0^c \rangle}{2T_i} \quad (6)$$

$$\langle A'_n \rangle = C_n^c \langle H_n^c \rangle - C_n^s \langle H_n^s \rangle, \; (n \geq 1) \quad (7)$$

$$\langle B'_n \rangle = C_n^c \langle H_n^s \rangle + C_n^s \langle H_n^c \rangle, \; (n \geq 1) \quad (8)$$

$$C_n^c = \frac{\xi_n}{T_i \sin\xi_n} \cos\left[\xi_n\left(1+\frac{2T_d}{T_i}\right)\right], \; (n \geq 1) \quad (9)$$

$$C_n^s = \frac{\xi_n}{T_i \sin\xi_n} \sin\left[\xi_n\left(1+\frac{2T_d}{T_i}\right)\right], \; (n \geq 1) \quad (10)$$

In the typical ellipsometer configuration, if collimated light emitted from the light source (LS) passes through a polarization state generator (PSG) and is reflected by the sample and then passes through a polarization state analyzer (PSA) to be incident on the photodetector element (PDE), a spectral radiant flux is converted into an electrical signal. In particular, the rotatable polarization elements used in the optical element rotation type spectroscopic ellipsometer are classified into a linear polarizer and a compensator and differently arranged in the polarization state generator and the polarization state analyzer depending on the type of optical element rotation type spectroscopic ellipsometers. At least one of the rotatable polarization elements in the optical element rotation type spectroscopic ellipsometer needs to rotate at a constant speed with a constant angular frequency and other rotatable polarization elements each stop at a designated position. Azimuthal angles of the rotatable polarization elements may be adjusted remotely by a hollow shaft motor and if the rotatable polarization elements are positioned at an azimuthal angle reference point, that is, an index origin of the hollow shaft motor, property axes of the rotatable polarization elements may be at different positions. For proper measurement, each of the azimuthal angle positions of the property axes of the polarization elements which are rotatable from an arbitrarily determined reference axis needs to be found. If a calibration already well known is used, the azimuthal angle positions of the property axes of the polarization elements may be each found at the reference axis coordinate system. Therefore, when transformed on the reference axis coordinate system, Equation (2) is given as follows.

$$I(\theta_r) = I_0 + \sum_{n=1}^{N_{ho}} [A_n \cos(n\theta_r) + B_n \sin(n\theta_r)] \quad (11)$$

Here, $\theta_r$, represents an azimuthal angle variation due to the constant angular velocity measured with respect to the reference axis, $I_0$ represents a direct current component of corrected Fourier coefficient, and $A_n$ and $B_n$ are the alternating current components of the corrected Fourier coefficients. In Equation (11), if the azimuthal angle is expressed by $\omega t = \theta_r + \theta_{r0,n}$, $-\theta_{r0,n}$ becomes a value of $\theta_r$ when $t=0$ and a relational Equation between the uncorrected and corrected Fourier coefficients is given as follows from an identity relational Equation between Equation (2) and Equation (11).

$$I_0 = I'_0 \quad (12)$$

$$A_n = A'_n \cos(n\theta_{r0,n}) + B'_n \sin(n\theta_{r0,n}) \quad (13)$$

$$B_n = -A'_n \sin(n\theta_{r0,n}) + B'_n \cos(n\theta_{r0,n}) \quad (14)$$

In the ellipsometer, since a data reduction function is used to extract polarization ellipsometric parameters of the sample from the corrected Fourier coefficients, it is very important to find a data reduction method suitable for the optical element rotation type spectroscopic ellipsometer. According to a stokes expression, a stokes vector of a light wave to be incident to pass through the polarization state generator is set to be $S^{(LS)} = (L_0, L_1, L_2, L_3)^T$, the Mueller-matrix of the sample is represented by $M^{(SP)} = (M_{jk})_{4 \times 4}$, and the Mueller-matrices of the polarization state generator and the polarization state analyzer are represented by $T_{PSG} M^{(PSG)}$ and $T_{PSA} M^{(PSA)}$, respectively, in which $T_{PSG}$ and $T_{PSA}$ each represent effective transmission coefficients of the polarization state generator and the polarization state analyzer, $M^{(DOS)} = (D_{jk})_{4 \times 4}$ is a Mueller-matrix of a detector optic system (DOS) disposed between the polarization state analyzer and the photodetector, and finally, $S^{(PDE)} = S_0^{(PDE)}$, $S_1^{(PDE)}, S_2^{(PDE)}, S_3^{(PDE)})^T$ is the stokes vector of the light wave incident on the photodetector. The azimuthal positions of the property axes of the fixed polarizer, the constant speed rotation polarizer, the constant speed rotation analyzer, and the fixed analyzer which are disposed in the polarization state generator and the polarization state analyzer are represented by P, $P_r$, $A_r$, and A in an arbitrary reference axis coordinate system, and the changes in the azimuthal angles are each described by the Mueller-matrices for the rotation of the coordinate system.

A stoke vector of the light wave incident on the photodetector element with respect to the quasi-monochromatic light wave may be described as follows.

$$S^{(PDE)} = T_{PSA} T_{PSG} M^{(DOS)} M^{(PSA)} M^{(SP)} M^{(PSG)} S^{(LS)} \quad (15)$$

When an area of the photodetector element is $A_{PDE}$ and a quantum efficiency of the photodetector element is $\mu_{QE}$, the spectral radiant flux measured by the photodetector element is represented by $I(\theta_r) = \mu_{QE} A_{PDE} S_0^{(PDE)}$ and solutions to the corrected Fourier coefficients obtained by the relational Equation are each given as simultaneous linear Equations for the Mueller-matrix elements of the sample. To more simply represent the simultaneous linear Equations, the column vector having the Mueller-matrix elements for the sample like $V^{(SP)} = (M_{11}, \ldots, M_{1v}, \ldots, M_{u1}, \ldots, M_{uv})^T$ is introduced. Here, u and v are integers differently given depending on a kind of optical element rotation type spectroscopic ellipsometers used. Therefore, the corrected Fourier coefficients are given by a scalar product as follows.

$$I_0 = \gamma \sum_{j=1}^{u} \sum_{k=1}^{v} i_{0,jk} M_{jk} = \gamma i_0 \cdot V^{(SP)} \quad (16)$$

$$A_n = \gamma \sum_{j=1}^{u} \sum_{k=1}^{v} a_{n,jk} M_{jk} = \gamma a_n \cdot V^{(SP)} \quad (17)$$

$$B_n = \gamma \sum_{j=1}^{u} \sum_{k=1}^{v} b_{n,jk} M_{jk} = \gamma b_n \cdot V^{(SP)} \quad (18)$$

Here, $i_0 = \partial I_0/\partial M_{11}, \ldots, \partial I_0/\partial M_{1v}, \ldots, \partial I_0/\partial M_{u1}, \ldots, \partial I_0/\partial M_{uv})/\gamma$, $a_n = (\partial A_n/\partial M_{11}, \ldots, \partial A_n/\partial M_{1v}, \ldots, \partial A_n/\partial M_{u1}, \ldots, \partial A_n/\partial M_{uv})/\gamma$, $b_n = (\partial B_n/\partial M_{11}, \ldots, \partial B_n/\partial M_{1v}, \ldots, \partial B_n/\partial M_{u1}, \ldots, \partial B_n/\partial M_{uv})/\gamma$ $\gamma$ are generally a function of only the azimuthal angle of the fixed optical elements, but are a function that further includes the azimuthal angle and the retardation angle of the compensator if the compensator is included and are described by a row vector. Here, $\gamma$ is a common factor that is associated with an intensity and polarization characteristics of the light source, an effective measurement area and quantum efficiency of the photodetector element, polarization dependent characteristics of a DOS, and a transmittance state of the optical element used in the optical element rotation type spectroscopic ellipsometer, which is given as follows.

$$\gamma = \kappa(1 + d_{12} \cos 2A + d_{13} \sin 2A)(1 + l_1 \cos 2P + l_2 \sin 2P) \quad (19)$$

Here, $\kappa = \mu_{QE} A_{PDE} T_{PSA} T_{PSG} D_{11} L_0$, $d_{12(13)} = D_{12(13)}/D_{11}$ $l_{1(2)} = L_{1(2)}/L_0$.

The solution of the simultaneous linear Equations depending on the total number of linear equations used for the data reduction is given in a unique or overdetermined form. The equation related to the data reduction may be applied to all types of optical element-rotation type ellipsometer.

A generalized data reduction method which may obtain ellipsometric parameters of the sample from all the corrected Fourier coefficients is introduced. If a column vector of the corrected Fourier coefficients is expressed by $X=(I_0, A_1, B_1, A_2, B_2, \ldots, A_{Nho}, B_{Nho})^T$ and the $(2N_{ho}+1)$-by-uv coefficient matrix consisting of the row vector as the component is expressed by $\Omega=\gamma(i_0, a_1, b_1, a_2, b_2, \ldots, a_{Nho}, b_{Nho})^T$, Equations (16) to (18) may be represented by $X=\Omega V^{(SP)}$. If a matrix rank of $\Omega$ is equal to or larger than a total number of unknown matrix elements in $M^{(SP)}$, a solution of the vector for the Mueller-matrix elements for the sample is given as follows.

$$V^{(SP)}=(\Omega^T\Omega)^{-1}\Omega^T X \qquad (20)$$

Therefore, if values of $\kappa$, $d_{12}$, $d_{13}$, $l_1$ and $l_2$ for each wavelength is obtained from a measurement result using the reference sample with the well known optical properties or a measurement result on a straight line without the sample based on Equation (19), the Mueller-matrix elements of the sample may be directly calculated from the values of the corrected Fourier coefficients based on Equation (20). It should be emphasized herein that the solution of the vector for the Mueller-matrix element calculated in the above manner may also be applied to an anisotropic sample.

Even if the values of $\kappa$, $d_{12}$, $d_{13}$, $l_1$ and $l_2$ are unknown, it is possible to obtain the measured values of the polarization measurement parameters of the sample defined by normalized Mueller-matrix elements like $m_{jk}=M_{jk}/M_{11}$. Further, in the case of the isotropic sample, generally, it may be simply represented by the polarization ellipsometric parameters of the sample defined like $N_{sp}=-m_{12}$ (or $-m_{21}$) and $C_{SP}=M_{33}$ (or $m_{44}$).

As described above, the spectral radiant flux of light is measured, an optical theoretical formula for the sample is established, data of the Mueller-matrix elements of the sample is calculated using a plurality of unknown parameters for a region set for the established theoretical formula, and the data is optimized using the least squares method or the like, thereby estimating the optical properties to be obtained from the sample. That is, other physical characteristics may be analyzed from the Mueller-matrix. In this manner, the linear polarizer-rotation type normal incidence ellipsometer according to the exemplary embodiment of the present invention may analyze various physical properties such as an interface property, a thickness of a thin film, a complex refractive index, a nano shape, an anisotropic property, a surface roughness, a composition ratio, crystallinity, and the like, of the sample from the measured Fourier coefficients and the measured components of the Mueller-matrix, and may apply the analyzed results to a measurement equipment for a semiconductor element process, a measurement equipment for a flat panel display process, a measurement equipment of a solar element, a thin film optical measurement equipment, a bio sensor, a gas sensor, or the like. Specifically, a physical property analysis method in a case where the analysis method like the nano pattern shape measurement is very complicated in the linear polarizer-rotation type normal incidence ellipsometer according to the exemplary embodiment of the present invention is as follows. First, Fourier coefficients for the sample to be measured or the measurement data of the Mueller-matrix elements is obtained, an optical theoretical formula for the sample is established, data of the Fourier coefficients or the Mueller-matrix elements calculated is obtained by using the plurality of unknown parameters determined in the region set for the established theoretical formula, a continuous function for the unknown parameters is created for the calculated data, and the continuous function is optimized by using the least squares method for the measurement data, thereby obtaining the physical properties of the sample. In this case, the ellipsometer according to the present invention may include a large capacity high speed calculating system configured of a high performance parallel computer, rigorous coupled-wave analysis (RCWA) algorithm based analysis software, and a large capacity data storage in order to rapidly find the physical property of the sample from the measurement data of the Fourier coefficients or the components of the Mueller-matrix measured for the sample.

[Method for Measuring Optical Properties of Sample Using Normal Incidence Ellipsometer of Present Invention]

Figure 6:
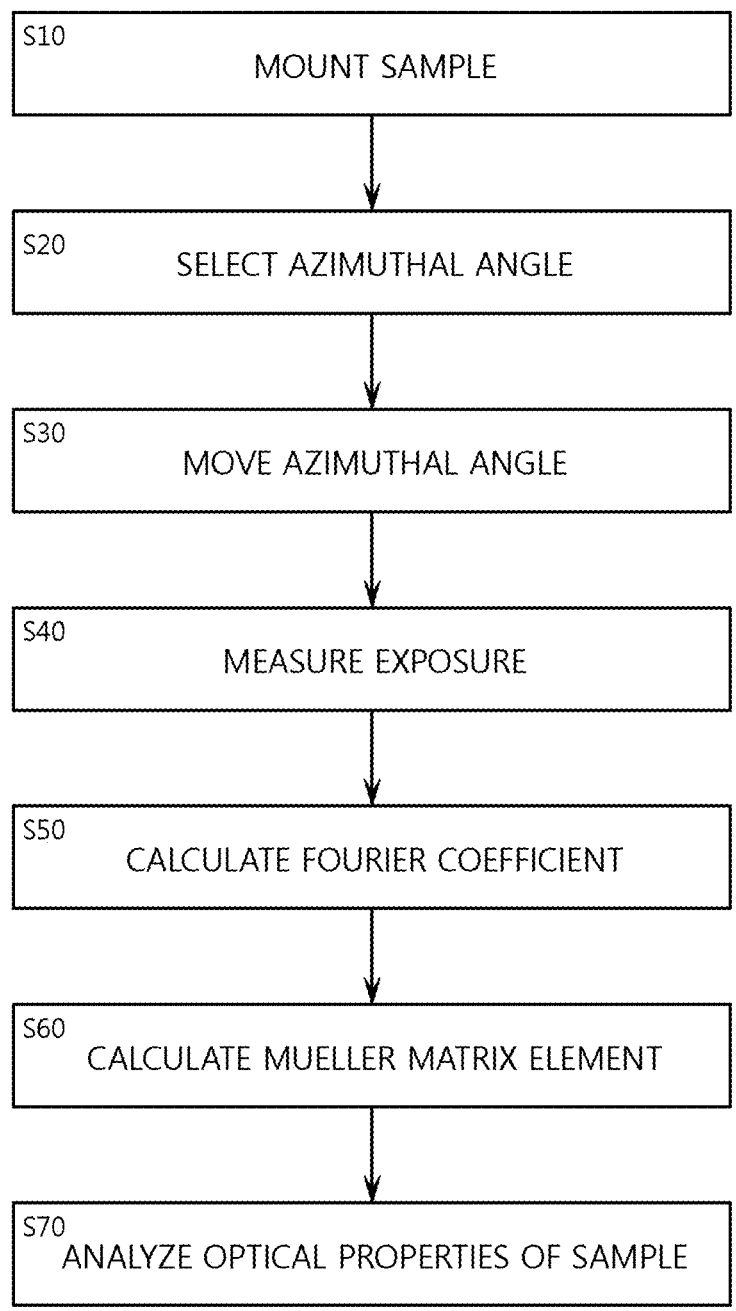
FIG. 6 is a flowchart illustrating a method for measuring optical properties of a sample using a linear polarizer-rotation type normal incidence ellipsometer of the present invention

FIG. 6 is a flowchart illustrating a method for measuring optical properties of a sample using a linear polarizer-rotation type normal incidence ellipsometer of the present invention. The method for measuring optical properties using the principle as described above will be described. As shown in FIG. 6, the method for measuring optical properties of a sample using a normal incidence ellipsometer of the present invention may include a sample mounting operation (S10), an azimuthal angle selecting operation (20), an azimuthal angle moving operation (S30), an exposure measuring operation (S40), a Fourier coefficient calculating operation (S50), a Mueller matrix element calculating operation (S60), and a sample optical property analysis operation (S70).

In the sample mounting operation (S10), the sample whose optical properties are to be measured is mounted and aligned on a sample holder of the normal incidence ellipsometer. In the azimuthal angle selecting operation (S20), azimuthal angle values of the fixed polarizer and the fixed analyzer are selected by the processor. In the azimuthal angle moving operation (S30), the fixed polarizer and the fixed analyzer are moved to a set azimuthal angle by the processor. In the exposure measuring operation (S40), an exposure value of the reflected collimated beam according to a change in azimuthal angles of the constantly rotating polarizer and the constantly rotating analyzer is measured by the photodetector element. In the Fourier coefficient calculating operation (S50), Fourier coefficient values of a spectral radiant flux waveform are calculated from the exposure values by the processor. In the Mueller matrix element calculating operation (S60), Mueller-matrix element values of the sample are calculated from the Fourier coefficient values by the processor. In the sample optical property analysis operation (S70), optical properties of the sample are analyzed and calculated from the Mueller-matrix element values by the processor.

The present invention is not limited to the above-described exemplary embodiments, the scope of application is diverse, and the present invention may be variously modified by a person skilled in the art to which the present invention pertains, without departing from the gist of the present invention claimed in the claims.

INDUSTRIAL APPLICABILITY

According to the present invention, a wavelength-independent linear polarizer is used as a device for analyzing a polarization state in configuring a normal incidence ellipsometer, whereby various problems that may arise due to the use of a wavelength-dependent compensator of the related art, that is, complicated equipment calibration procedures and resultant errors, may be solved. In addition, according to the present invention, it is possible to expand the measurement wavelength region more freely than in the related art, thereby improving measurement reliability of the normal incidence ellipsometer.

The invention claimed is:
1. A normal incidence ellipsometer comprising:
a light source including a collimating optical system and emitting an incident collimated beam toward a sample;
a beam splitter disposed between the light source and the sample and directing a portion of the incident collimated beam in a direction perpendicular to a surface of the sample;
a fixed polarizer disposed between the beam splitter and the sample and fixed at a preset azimuthal angle to allow only a linearly polarized component of the incident collimated beam in a preset direction to pass therethrough;
a constantly rotating polarizer disposed between the fixed polarizer and the sample and rotating at a constant speed to regularly modulate a polarization state of the incident collimated beam according to a constant rotational frequency;
a photodetector element measuring an exposure value of a spectral radiant flux upon receiving a reflected collimated beam reflected from the sample;
a constantly rotating analyzer disposed between the sample and the photodetector element and rotating at a constant speed to regularly modulate a polarization state of the reflected collimated beam according to a constant rotational frequency;
a fixed analyzer disposed between the constantly rotating analyzer and the photodetector element and fixed at a preset azimuthal angle to allow only a linearly polarized component of the reflected collimated beam in a preset direction to pass therethrough; and
a processor controlling the azimuthal angles of the fixed polarizer and the fixed analyzer, constant angular velocities of the constantly rotating polarizer and the constantly rotating analyzer and calculating optical properties of the sample by analyzing the exposure value of the spectral radiant flux measured by the photodetector element,
wherein the fixed polarizer and the fixed analyzer are integrally formed as one linear polarizer and the constantly rotating polarizer and the constantly rotating analyzer are integrally formed as one constantly rotating linear polarizer.

2. The normal incidence ellipsometer of claim 1, wherein the beam splitter, the fixed polarizer, and the fixed analyzer are integrally formed as one beam splitting linear polarizer.

3. The normal incidence ellipsometer of claim 2, wherein the beam splitting linear polarizer is a Wollaston Prism.

4. The normal incidence ellipsometer of claim 1, wherein the photodetector element is at least one selected from pixels for a specified wavelength band or binned pixels in a spectrometer including a charge coupled device (CCD), a complementary metal oxide semiconductor (CMOS), or a photodiode array device in which pixels are arranged in a linear or two-dimensional (2D) planar structure.

5. The normal incidence ellipsometer of claim 4, wherein the photodetector element is at least one selected from pixels for a specified wavelength band or binned pixels in one spectrometer or in a spectrometer set including an s-polarized spectrometer and a p-polarized spectrometer.

6. The normal incidence ellipsometer of claim 1, wherein the photodetector element is configured as a single point photodetector including a photomultiplier tube (PMT) and a photodiode when the light source is at least one light source device having a single wavelength selected from a gas laser and a laser diode.

7. The normal incidence ellipsometer of claim 1, wherein the photodetector element is one pixel selected from an imaging photodetector including a CCD or CMOS in which pixels are arranged in a 2D planar structure.

8. The normal incidence ellipsometer of claim 1, wherein a hollow shaft stepping motor for azimuthal angle adjustment is provided in the fixed polarizer and the fixed analyzer, and constantly rotating hollow shaft motor for constant angular velocity adjustment is provided in the constantly rotating polarizer and the constantly rotating analyzer.

9. The normal incidence ellipsometer of claim 1, wherein the processor comprises:
a calculation unit calculating Fourier coefficient values for a spectral radiant flux waveform from exposure values of the spectral radiant flux of light measured by the photodetector element, calculating Mueller-matrix element values of the sample from the Fourier coefficient values, and analyzing and calculating optical property values of the sample from the Mueller-matrix element values;
a controller remotely controlling the azimuthal angles of the fixed polarizer and the fixed analyzer using a hollow shaft stepping motor and remotely controlling the constant angular velocities of the constantly rotating polarizer and the constantly rotating analyzer using a constant rotation hollow shaft motor;
a storage unit storing measured values which are the exposure values of the spectral radiant flux, the calculated values which are the Fourier coefficient values and the Mueller-matrix element values, analysis values which are the optical property values of the sample; and
an output unit outputting the measured values, the calculated values, and the analysis values.

10. The normal incidence ellipsometer of claim 9, wherein the light source is at least one selected a xenon lamp, a tungsten-halogen lamp, a deuterium lamp, a laser driven light source, a gas laser, and a laser diode, or light emitted therefrom is transmitted through an optical fiber.

11. The normal incidence ellipsometer of claim 1, further comprising:
a shielding booth shielding an optical path from outside atmosphere; and
a gas supply device connected to the shielding booth to supply an inert gas.

12. The normal incidence ellipsometer of claim 11, wherein the inert gas is a nitrogen gas or an argon gas.

13. The normal incidence ellipsometer of claim 1, further comprising:
a focusing optical system disposed between the constantly rotating polarizer and the sample and causing the incident collimated beam to be converged to focus on a local area of the sample.

14. The normal incidence ellipsometer of claim 13, wherein the focusing optical system is one selected from at least one mirror, at least one lens, or a set of at least one mirror and at least one lens in order to correct chromatic aberration for a broadband wavelength.

15. The normal incidence ellipsometer of claim 14, wherein, in the focusing optical system, the mirror or the lens is coated with a single thin film or a multilayer thin film to improve transmission or reflection efficiency.

16. The normal incidence ellipsometer of claim 1, further comprising:
a sample transport system including a sample storage container accommodating and storing a plurality of samples and a sample transport device sequentially drawing out the plurality of samples from the sample storage container one by one according to a preset rule, arranging the drawn sample on a sample holder of the normal incidence ellipsometer, and returning a measurement-completed sample to its original location of the sample storage container.

17. The normal incidence ellipsometer of claim 1, further comprising:
a sample aligning system including an alignment laser emitting light for sample alignment, an alignment optical system causing light emitted from the laser to be incident on the sample in a preset direction, and an alignment photodetector receiving light reflected after being incident on the sample and determining a location of the sample.

18. The normal incidence ellipsometer of claim 1, further comprising:
a vibration suppression system provided at a lower portion of the normal incidence ellipsometer to prevent an influence of vibration of a measurement environment.

19. The normal incidence ellipsometer of claim 1, further comprising:
a thermostat or a cooling device maintaining a measurement environment temperature or performing cooling to prevent an occurrence of a measurement error due to a temperature change.

20. A method for measuring optical properties of a sample using the normal incidence ellipsometer of claim 1, the method comprising:
a sample mounting operation in which the sample whose optical properties are intended to be measured is mounted and aligned on the sample holder of the normal incidence ellipsometer;
an azimuthal angle selecting operation in which azimuthal angle values of the fixed polarizer and the fixed analyzer are selected by the processor;
an azimuthal angle moving operation in which the fixed polarizer and the fixed analyzer are moved to set azimuthal angles by the processor;
an exposure measuring operation in which exposure values of spectral radiant fluxes of the reflected collimated beam according to the change in the azimuthal angles of the constantly rotating polarizer and the constantly rotating analyzer are measured by the photodetector element;
a Fourier coefficient calculating operation in which Fourier coefficient values of a spectral radiant flux waveform are calculated from the exposure values of the spectral radiant fluxes by the processor;
a Mueller-matrix element value calculating operation in which Mueller-matrix element values of the sample are calculated from the Fourier coefficient values by the processor; and
a sample optical property analyzing operation in which optical property values of the sample are analyzed and calculated from the Mueller-matrix element values by the processor.

21. The method of claim 20, wherein the optical properties are at least one selected from interfacial properties, a thin film thickness, a complex refractive index, a nano-shape, anisotropic properties, surface roughness, a composition ratio, and crystallinity.

* * * * *